(12) United States Patent
Chang et al.

(10) Patent No.: US 11,836,321 B2
(45) Date of Patent: Dec. 5, 2023

(54) OPTICAL SENSING DEVICE

(71) Applicant: AUO Corporation, Hsinchu (TW)

(72) Inventors: Xiang-Rui Chang, Hsinchu (TW); Chao-Chien Chiu, Hsinchu (TW)

(73) Assignee: AUO Corporation, Hsinchu (TW)

(*) Notice: Subject to any disclaimer, the term of this patent is extended or adjusted under 35 U.S.C. 154(b) by 7 days.

(21) Appl. No.: 17/863,406

(22) Filed: Jul. 13, 2022

(65) Prior Publication Data

US 2023/0026218 A1 Jan. 26, 2023

Related U.S. Application Data

(60) Provisional application No. 63/224,977, filed on Jul. 23, 2021.

(30) Foreign Application Priority Data

Nov. 18, 2021 (TW) .................................. 110143054

(51) Int. Cl.
*G06F 3/042* (2006.01)

(52) U.S. Cl.
CPC .... *G06F 3/042* (2013.01); *G06F 2203/04107* (2013.01)

(58) Field of Classification Search
CPC ................... G06F 3/042; G06F 2203/04107
See application file for complete search history.

(56) References Cited

U.S. PATENT DOCUMENTS

| | | | |
|---|---|---|---|
| 9,368,541 B2 | 6/2016 | Kurokawa et al. | |
| 10,038,022 B1* | 7/2018 | Chen | ................. H01L 27/14623 |
| 10,784,331 B2 | 9/2020 | Zeng et al. | |
| 2015/0295006 A1* | 10/2015 | Chen | ................. H01L 29/7869 257/43 |
| 2020/0203468 A1 | 6/2020 | Zeng et al. | |
| 2021/0020710 A1 | 1/2021 | Park | |
| 2021/0200366 A1* | 7/2021 | Bok | ..................... H10K 59/122 |

(Continued)

FOREIGN PATENT DOCUMENTS

| | | |
|---|---|---|
| CN | 109545825 | 3/2019 |
| CN | 109686770 | 4/2019 |

(Continued)

*Primary Examiner* — Antonio Xavier
(74) *Attorney, Agent, or Firm* — JCIPRNET

(57) ABSTRACT

An optical sensing device includes a substrate, sensing elements, a planarization layer, and a light-shielding layer. The sensing elements are located on the substrate. Each sensing element includes a first net-shaped electrode, a second net-shaped electrode, and a sensing layer. The first net-shaped electrode is located between the sensing layer and the substrate. The sensing layer is located between the first net-shaped electrode and the second net-shaped electrode. The planarization layer is located on the sensing elements and the substrate and has via holes. The light-shielding layer is located on the planarization layer and includes net-shaped light-shielding patterns. The net-shaped light-shielding patterns are overlapped with the second net-shaped electrodes of the sensing elements, respectively, and the net-shaped light-shielding patterns are electrically connected to the second net-shaped electrodes of the sensing elements via the via holes, respectively.

16 Claims, 9 Drawing Sheets

(56) References Cited

U.S. PATENT DOCUMENTS

| | | | |
|---|---|---|---|
| 2021/0320130 A1 | 10/2021 | Xian et al. | |
| 2021/0408170 A1 | 12/2021 | Li | |
| 2023/0118413 A1* | 4/2023 | Choi | G06F 3/0446 |
| | | | 257/175 |
| 2023/0255088 A1* | 8/2023 | Hai | H10K 59/80 |
| | | | 257/40 |

FOREIGN PATENT DOCUMENTS

| | | |
|---|---|---|
| CN | 109887963 | 6/2019 |
| CN | 109992155 | 7/2019 |
| CN | 110112193 | 8/2019 |
| WO | 2020259647 | 12/2020 |

* cited by examiner

OPTICAL SENSING DEVICE

CROSS-REFERENCE TO RELATED APPLICATION

This application claims the priority benefit of U.S. provisional application Ser. No. 63/224,977, filed on Jul. 23, 2021 and Taiwan application serial no. 110143054, filed on Nov. 18, 2021. The entirety of each of the above-mentioned patent applications is hereby incorporated by reference herein and made a part of this specification.

BACKGROUND OF THE INVENTION

Field of the Invention

The invention relates to a sensing device, and more particularly, to an optical sensing device.

Description of Related Art

In order to construct a smart living environment, sensing technology has been widely used in various electronic devices. For example, devices such as mobile phones and electronic locks use fingerprint sensors to protect personal data security and access control. In terms of practical application requirements, the fingerprint sensors need to be equipped with a light collimation design. For example, a light-shielding layer is used to limit the light-receiving angle of the sensing elements, and at the same time an organic material is used to stack a sufficient thickness to facilitate the focusing of the microlens and the collimation of light, for the object of obtaining a clearer fingerprint image.

However, since the light-shielding layer containing a metal material almost covers the entire sensing device, parasitic capacitance or stray capacitance is likely to be generated between the light-shielding layer and other conductive layers in the device, thus reducing the sensing sensitivity of the sensing elements.

SUMMARY OF THE INVENTION

The invention provides an optical sensing device with improved sensing sensitivity.

An embodiment of the invention provides an optical sensing device, including: a substrate; a plurality of sensing elements located on the substrate, and each of the sensing elements includes a first net-shaped electrode, a second net-shaped electrode, and a sensing layer, wherein the first net-shaped electrode is located between the sensing layer and the substrate, and the sensing layer is located between the first net-shaped electrode and the second net-shaped electrode; a planarization layer located on the sensing elements and the substrate and having a plurality of via holes; and a light-shielding layer located on the planarization layer and including a plurality of net-shaped light-shielding patterns, wherein the plurality of net-shaped light-shielding patterns are respectively overlapped with the second net-shaped electrodes of the plurality of sensing elements, and the plurality of net-shaped light-shielding patterns are respectively electrically connected to the second net-shaped electrodes of the plurality of sensing elements via the plurality of via holes.

In an embodiment of the invention, the net-shaped light-shielding patterns are partially overlapped with the first net-shaped electrode.

In an embodiment of the invention, the sensing layer includes a plurality of separated sensing patterns, wherein each of the net-shaped light-shielding patterns has a plurality of openings, and the plurality of openings are respectively overlapped with the plurality of sensing patterns.

In an embodiment of the invention, a spacing between the plurality of sensing patterns is the same.

In an embodiment of the invention, a shape of the sensing patterns is a polygon or a circle.

In an embodiment of the invention, the first net-shaped electrode includes a first sensing electrode portion and a first bridge portion connected to each other, the first sensing electrode portion is overlapped with the sensing layer, and the first bridge portion is not overlapped with the sensing layer.

In an embodiment of the invention, the second net-shaped electrode includes a second sensing electrode portion and a second bridge portion connected to each other, the second sensing electrode portion is overlapped with the sensing layer, and the second bridge portion is not overlapped with the sensing layer.

In an embodiment of the invention, the second bridge portion is not overlapped with the first bridge portion.

In an embodiment of the invention, the light-shielding layer further includes a plurality of wire patterns respectively located between the plurality of net-shaped light-shielding patterns and separated from the plurality of net-shaped light-shielding patterns.

In an embodiment of the invention, the plurality of wire patterns are respectively electrically connected to a system voltage or output a sensing signal generated by the sensing elements.

Another embodiment of the invention provides an optical sensing device, including: a substrate; a plurality of sensing elements located on the substrate for generating a sensing signal; a planarization layer located on the sensing elements and the substrate; and a light-shielding layer located on the planarization layer and including a plurality of separated light-shielding patterns and a plurality of wire patterns, wherein the plurality of light-shielding patterns are respectively overlapped with the plurality of sensing elements, and the plurality of wire patterns are respectively electrically connected to a system voltage or output the sensing signal.

In an embodiment of the invention, the light-shielding patterns have a net-like contour.

In an embodiment of the invention, the sensing elements include a first net-shaped electrode, a second net-shaped electrode, and a plurality of sensing patterns, and the plurality of sensing patterns are located between the first net-shaped electrode and the second net-shaped electrode.

In an embodiment of the invention, the light-shielding patterns are electrically connected to the second net-shaped electrode via holes of the planarization layer.

In an embodiment of the invention, the light-shielding patterns are partially overlapped with the first net-shaped electrode.

In an embodiment of the invention, the second net-shaped electrode is partially overlapped with the first net-shaped electrode.

In an embodiment of the invention, the light-shielding patterns have a plurality of openings, and the plurality of openings respectively are overlapped with the plurality of sensing patterns.

In order to make the aforementioned features and advantages of the disclosure more comprehensible, embodiments accompanied with figures are described in detail below.

DESCRIPTION OF THE EMBODIMENTS

Figure 1A:
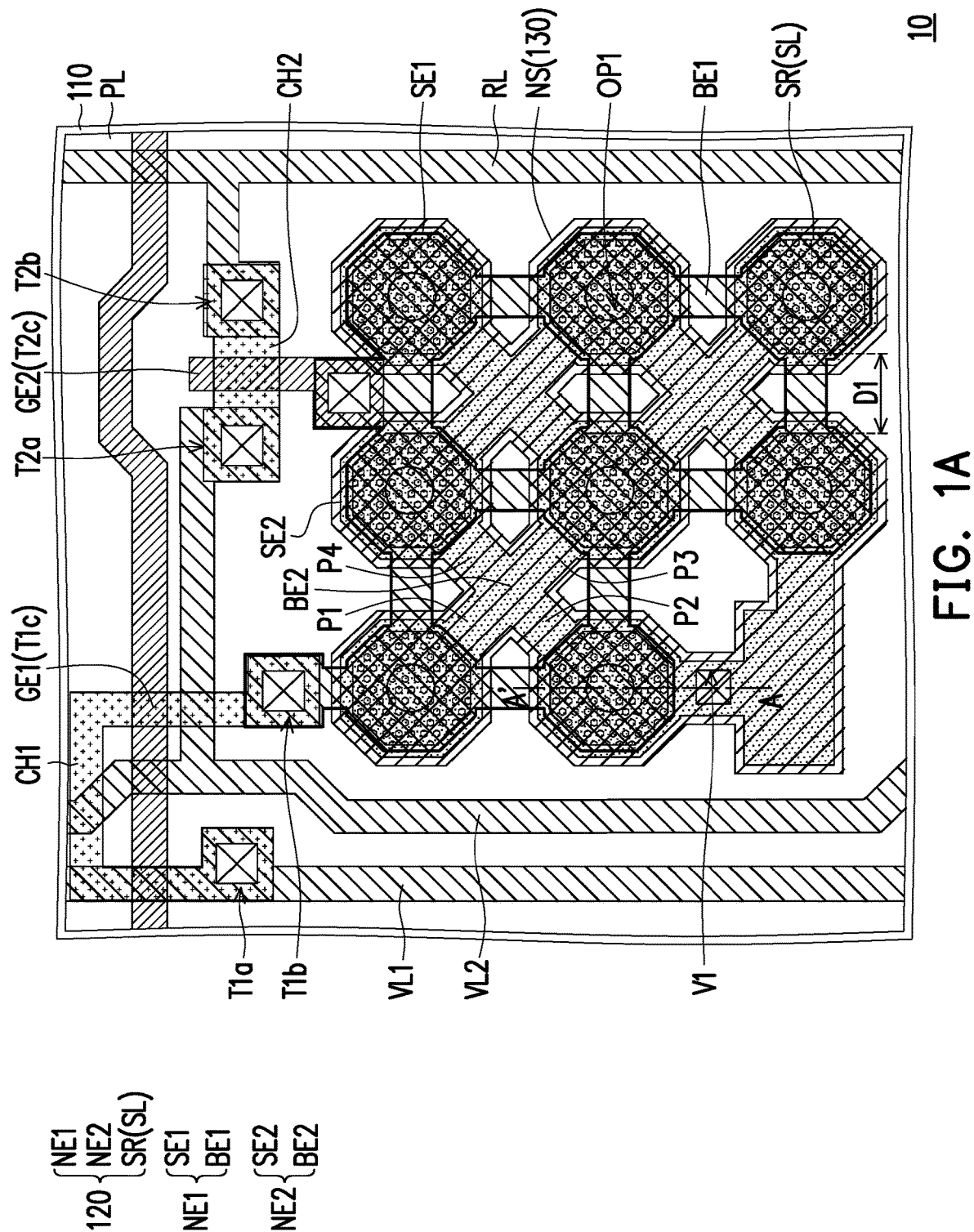
FIG. 1A is a schematic partial top view of an optical sensing device 10 according to an embodiment of the invention.

In the figures, for clarity, the thicknesses of, for example, layers, films, panels, and regions are enlarged. In the entire specification, the same reference numerals represent the same elements. It should be understood that, when a layer, film, region, or an element of a substrate is "on" another element or "connected to" another element, the element may be directly on the other element or connected to the other element, or an intermediate element may also be present. On the other hand, when an element is "directly on another element" or "directly connected to" another element, an intermediate element is not present. As used in the present specification, "connected to" may refer to a physical and/or electrical connection. Furthermore, "electrically connected" or "coupled" may mean that other elements are present between two elements.

It should be understood that, even though terms such as "first", "second", "third", etc., in the specification may be used herein to describe various elements, members, regions, layers, and/or portions, these elements, members, regions, layers, and/or portions should not be limited by these terms. These terms are only used to distinguish one element, member, region, layer, or portion from another element, member, region, layer, or portion. Therefore, the first "element," "member," "region," "layer," or "portion" discussed below may be referred to as a second element, member, region, layer, or portion without departing from the teachings herein.

The terminology used here is only for the object of describing specific embodiments and is not limiting. As used herein, unless the content clearly indicates otherwise, the singular forms "a", "one", and "the" are intended to include the plural form, including "at least one" or representing "and/or". As used in the specification, the term "and/or" includes any and all combinations of one or a plurality of the associated listed items. It should also be understood that when used in the specification, the term "containing" and/or "including" specifies the presence of the stated features, regions, wholes, steps, operations, elements, and/or members, but does not exclude the presence or addition of one or a plurality of other features, regions, wholes, steps, operations, elements, members, and/or a combination thereof.

In addition, relative terms such as "lower" or "bottom" and "upper" or "top" may be used herein to describe the relationship of one element to another element as shown in the figures. It should be understood that relative terms are intended to encompass different orientations of the device in addition to the orientation shown. For example, if the device in one figure is turned over, an element described as being on the "lower" side of the other elements is oriented to being on the "upper" side of the other elements. Thus, the exemplary term "below" may include the orientations "below" and "above", depending on the particular orientation of the figure. Similarly, if the device in one figure is turned over, an element described as "under" or "below" other elements is oriented "above" the other elements. Thus, the exemplary term "under" or "below" may encompass the orientations of above and below.

In the present specification, exemplary embodiments are described with reference to cross sections of schematics used as ideal embodiments. Therefore, changes in shape of figures used as the results of, for example, manufacturing techniques and/or tolerance may be expected. Therefore, the embodiments of the invention should not be construed to limit the specific shapes of the regions shown in the present specification, but instead include shape deviations caused by, for example, manufacture. For example, regions shown or described as flat generally may have rough and/or non-linear features. Moreover, an acute angle shown may be round. Therefore, the regions shown in the figures are substantially schematic, and the shapes thereof do not refer to the accurate shapes of the regions shown, and also do not limit the scope of the claims.

Figure 1B:
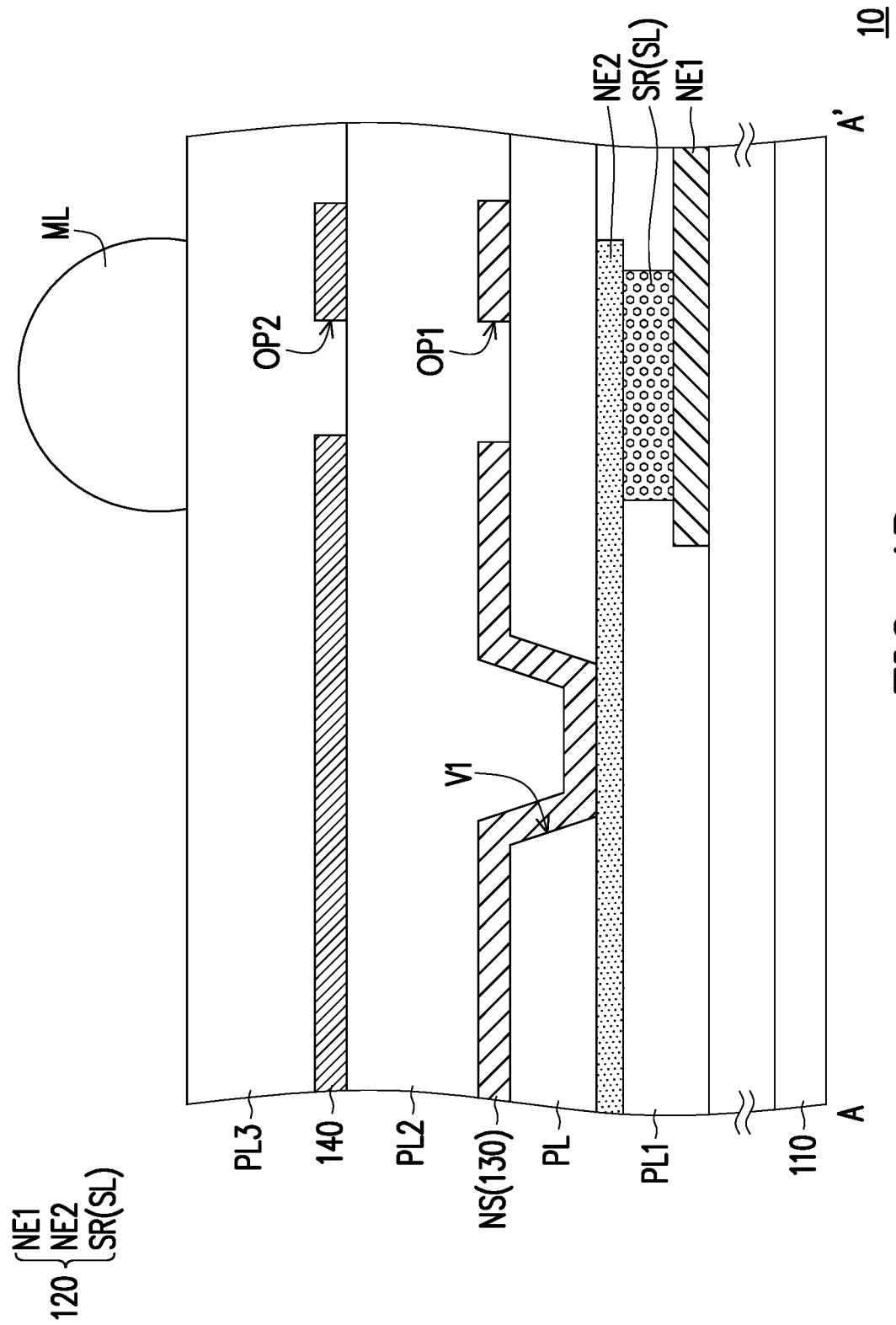
FIG. 1B is a schematic cross-sectional view along section line A-A' of FIG. 1A.
Figure 1C:
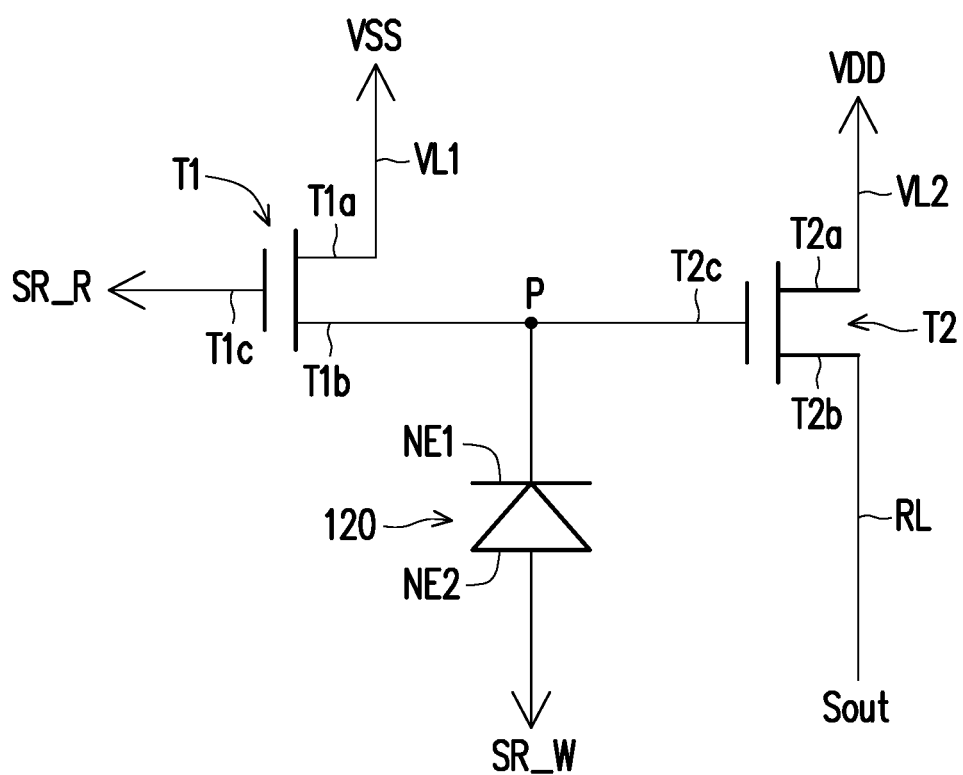
FIG. 1C is a schematic circuit diagram of the optical sensing device 10 according to an embodiment of the invention.

FIG. 1A is a schematic partial top view of an optical sensing device 10 according to an embodiment of the invention. FIG. 1B is a schematic cross-sectional view along section line A-A' of FIG. 1A. FIG. 1C is a schematic circuit diagram of the optical sensing device 10 according to an embodiment of the invention. In order to make the expression of the figures more concise, FIG. 1A omits planarization layers PL1, PL2, and PL3, a light-shielding layer 140, and a microlens structure ML in FIG. 1B, and FIG. 1B omits the film layers between the substrate 110 and the sensing elements 120.

First, referring to both FIG. 1A to FIG. 1B, the optical sensing device 10 includes: a substrate 110; a plurality of sensing elements 120 located on the substrate 110, and each of the sensing elements 120 includes a first net-shaped electrode NE1, a second net-shaped electrode NE2, and a sensing layer SL, wherein the first net-shaped electrode NE1 is located between the sensing layer SL and the substrate 110, and the sensing layer SL is located between the first net-shaped electrode NE1 and the second net-shaped electrode NE2; a planarization layer PL located on the sensing elements 120 and the substrate 110, and having a plurality of via holes V1; and a light-shielding layer 130 located on the planarization layer PL and including a plurality of net-shaped light-shielding patterns NS, wherein the plurality of net-shaped light-shielding patterns NS are respectively overlapped with second net-shaped electrodes NE2 of the plurality of sensing elements 120, and the plurality of net-shaped light-shielding patterns NS are respectively electrically connected to the second net-shaped electrodes NE2 of the plurality of sensing elements 120 via the plurality of via holes V1.

In the optical sensing device 10 of an embodiment of the invention, the second net-shaped electrodes NE2 of the sensing elements 120 are electrically connected via the net-shaped light-shielding patterns NS to eliminate parasitic capacitance between the net-shaped light-shielding patterns NS and the second net-shaped electrodes NE2, thereby improving the sensing sensitivity of the optical sensing device 10.

Hereinafter, in conjunction with FIG. 1A to FIG. 1C, the implementation of each element of the optical sensing device 10 is explained, but the invention is not limited thereto.

In the present embodiment, the substrate 110 of the optical sensing device 10 may be a transparent substrate or an opaque substrate, and the material thereof may be a ceramic substrate, a quartz substrate, a glass substrate, a polymer substrate, or other suitable materials, but is not limited thereto. Various film layers for forming the sensing elements 120, the light-shielding layer 130, the planarization layer PL, transistors, signal lines, storage capacitors, and the like may be disposed on the substrate 110.

The plurality of sensing elements 120 of the optical sensing device 10 may be arranged on the substrate 110 in an array, and FIG. 1A only illustrates one of the sensing elements 120. The first net-shaped electrode NE1 of each of the sensing elements 120 may include a plurality of first sensing electrode portions SE1 and a plurality of first bridge portions BE1, and the first sensing electrode portions SE1 may have a polygonal or circular contour. For example, in the present embodiment, the first net-shaped electrode NE1 may include eight first sensing electrode portions SE1 and ten first bridge portions BE1, but the number of the first sensing electrode portions SE1 and the first bridge portions BE1 is not limited thereto. The first sensing electrode portions SE1 may have an approximately octagonal contour, and two sides of the first bridge portions BE1 in the shape of a rectangular block are respectively connected to one side of two adjacent first sensing electrode portions SE1, so that the first sensing electrode portions SE1 may be connected to each other via the first bridge portions BE1, but the shapes of the first sensing electrode portions SE1 and the first bridge portions BE1 are not limited thereto. The material of the first net-shaped electrode NE1 may be molybdenum, aluminum, titanium, copper, gold, silver, or other conductive materials, or an alloy of two or more of the above materials, or a combination of two or more of the above materials.

In the present embodiment, the sensing layer SL of each of the sensing elements 120 may include a plurality of separate sensing patterns SR, such as the eight sensing patterns SR shown in FIG. 1A, but not limited thereto. In some embodiments, the plurality of sensing patterns SR of the sensing layer SL may be connected to each other. In some embodiments, the number of sensing patterns SR may be more or less. In some embodiments, a spacing D1 between the sensing patterns SR may be the same. In some embodiments, the spacing D1 between the sensing patterns SR may be different. In some embodiments, the number of the sensing patterns SR and the number of the first sensing electrode portions SE1 may be the same or different.

In some embodiments, each of the sensing patterns SR may be overlapped with one first sensing electrode portion SE1 of the first net-shaped electrode NE1, but not overlapped with the first bridge portions BE1 of the first net-shaped electrode NE1. In other words, the orthographic projection of the sensing patterns SR on the substrate 110 may be overlapped with the orthographic projection of the first sensing electrode portions SE1 on the substrate 110, but the orthographic projection of the sensing patterns SR on the substrate 110 may be outside the orthographic projection of the first bridge portions BE1 at the substrate 110. In some embodiments, the shape of the sensing patterns SR may be a polygon or a circle, but is not limited thereto. In some embodiments, the shape of the sensing patterns SR may be the same as that of the first sensing electrode portion SE1. The material of the sensing layer SL may be silicon-rich oxide (SRO), silicon-rich oxide doped with germanium, or other suitable materials.

The second net-shaped electrode NE2 of each of the sensing elements 120 may include second sensing electrode portions SE2 and second bridge portions BE2, wherein the second sensing electrode portions SE2 are overlapped with the sensing patterns SR and the first sensing electrode portions SE1, and the second bridge portions BE2 are not overlapped with the sensing patterns SR. For example, the second sensing electrode portions SE2 may have an approximately octagonal shape, the second bridge portions BE2 may have an X shape, and four end portions P1, P2, P3, and P4 of the second bridge portions BE2 may be respectively connected to one side of the four adjacent second sensing electrode portions SE2, so that the eight second sensing electrode portions SE2 shown in FIG. 1A may be connected to each other via three second bridge portions BE2, but the shapes and numbers of the second sensing electrode portions SE2 and the second bridge portions BE2 are not limited thereto. In some embodiments, the second sensing electrode portions SE2 and the second bridge portions BE2 may have other shapes and/or numbers.

In the present embodiment, the second bridge portions BE2 are not overlapped with the first bridge portions BE1, so as to avoid parasitic capacitance from growing between the first net-shaped electrode NE1 and the second net-shaped electrode NE2. The material of the second net-shaped electrode NE2 is preferably a transparent conductive material, such as ITO, IZO, aluminum-tin oxide, aluminum-zinc oxide, IGZO, other suitable oxides, or stacked layers of at least two of the above.

The planarization layer PL is located between the light-shielding layer 130 and the sensing elements 120, and the net-shaped light-shielding patterns NS of the light-shielding layer 130 may be electrically connected to the second net-shaped electrode NE2 via the via holes V1 in the planarization layer PL, so that the net-shaped light-shielding patterns NS and the second net-shaped electrode NE2 are made equal potential. In this way, parasitic capacitance may be avoided from being formed between the net-shaped light-shielding patterns NS and the second net-shaped electrode NE2.

In some embodiments, the net-shaped light-shielding patterns NS may be substantially completely overlapped with the second net-shaped electrode NE2. In other words, the contour or shape of the net-shaped light-shielding patterns NS may be substantially the same as the second net-shaped electrode NE2. In this way, the net-shaped light-shielding patterns NS may be overlapped with the first sensing electrode portions SE1 of the first net-shaped electrode NE1 but not overlapped with the first bridge portions BE1. In this way, the parasitic capacitance formed between the net-shaped light-shielding patterns NS and the first bridge portions BE1 may also be reduced.

The net-shaped light-shielding patterns NS may also have a plurality of openings OP1, and the openings OP1 are respectively overlapped with the sensing patterns SR, so as to control the light-receiving range of the sensing patterns SR. In some embodiments, the optical sensing device 10 may further include the planarization layer PL2 and the light-shielding layer 140, and the planarization layer PL2 is sandwiched between the light-shielding layer 140 and the light-shielding layer 130. The light-shielding layer 140 may have a plurality of openings OP2, and the openings OP2 are overlapped with the openings OP1 respectively. In some embodiments, the optical sensing device 10 may further include the planarization layer PL3 and the microlens structure ML, wherein the planarization layer PL3 is sandwiched between the microlens structure ML and the light-shielding layer 140, and the microlens structure ML is overlapped with the openings OP1 and OP2. In this way, the microlens structure ML may be used with the openings OP1 and OP2 to control the light-receiving angle of the sensing patterns SR, thereby realizing the light collimation design.

In the present embodiment, the optical sensing device 10 may further include the planarization layer PL1, and the planarization layer PL1 is located between the planarization layer PL and the substrate 110. The material of the planarization layers PL, PL1, PL2, and PL3 may include an organic material, such as acrylic material, siloxane material, polyimide material, epoxy material, or a laminate of the above materials, but not limited thereto.

Please refer to FIG. 1A and FIG. 1C at the same time, in the present embodiment, the optical sensing device 10 may further include transistors T1 and T2 and signal lines VL1, VL2, and RL, wherein the signal lines VL1, VL2, and RL may belong to the same film layer as the first net-shaped electrodes NE1 of the sensing elements 120, and the signal lines VL1 and VL2 may be electrically connected to a system voltage VSS and a system voltage VDD, respectively. A node P is coupled between the first net-shaped electrodes NE1 of the sensing elements 120, a second terminal T1b of the transistor T1, and a control terminal T2c of the transistor T2. A gate GE1 may form a control terminal T1c of the transistor T1, and a semiconductor pattern CH1 may form the channels of the transistor T1. A gate GE2 may form the control terminal T2c of the transistor T2, and a semiconductor pattern CH2 may form the channels of the transistor T2. A first terminal T1a of the transistor T1 may receive the system voltage VSS from the signal line VL1, and the control terminal T1c of the transistor T1 may receive a driving signal SR_R, so that the node P returns to the system voltage VSS level. The sensing elements 120 are used for performing a sensing operation to generate a sensing signal Sout. A first terminal T2a of the transistor T2 may receive the system voltage VDD from the signal line VL2. When the sensing elements 120 perform sensing, the sensing elements 120 start to leak and the voltage level of the node P is dropped. At this point, a driving signal SR_W applied to the second net-shaped electrode NE2 may raise the voltage level of the node P via the capacitive effect of the sensing elements 120, thereby turning on the transistor T2, so that the sensing signal Sout may be read via the signal line RL.

In the following, other embodiments of the invention are further described using FIG. 2A to FIG. 4B. In addition, the reference numerals and related contents of the embodiments of FIG. 1A to FIG. 1C are used, wherein the same numerals are used to represent the same or similar elements, and the description of the same technical contents is omitted. Regarding the description of the omitted parts, reference may be made to the embodiments of FIG. 1A to FIG. 1C, and is not repeated in the following description.

Figure 2A:
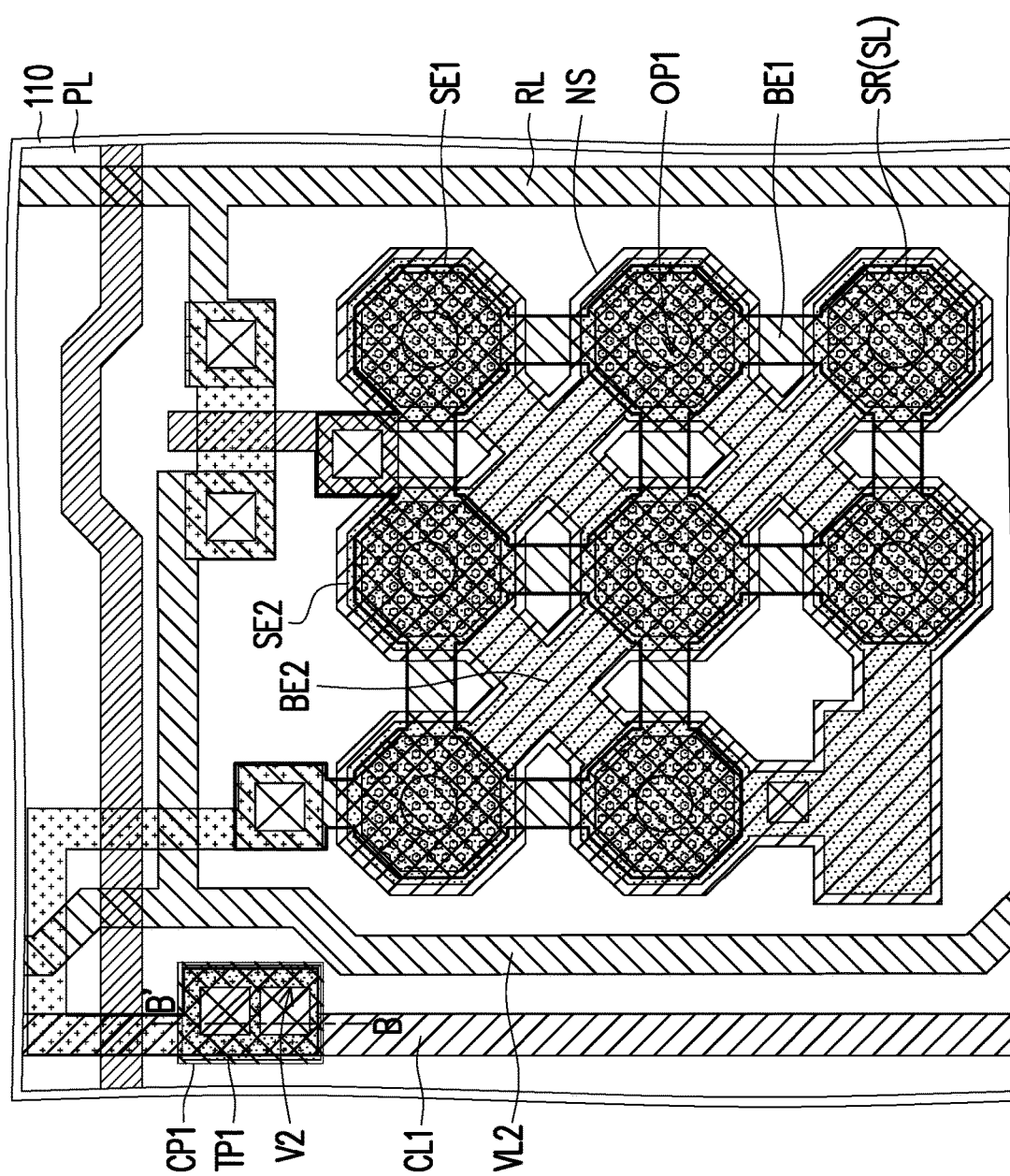
FIG. 2A is a schematic partial top view of an optical sensing device 20 according to an embodiment of the invention.
Figure 2B:
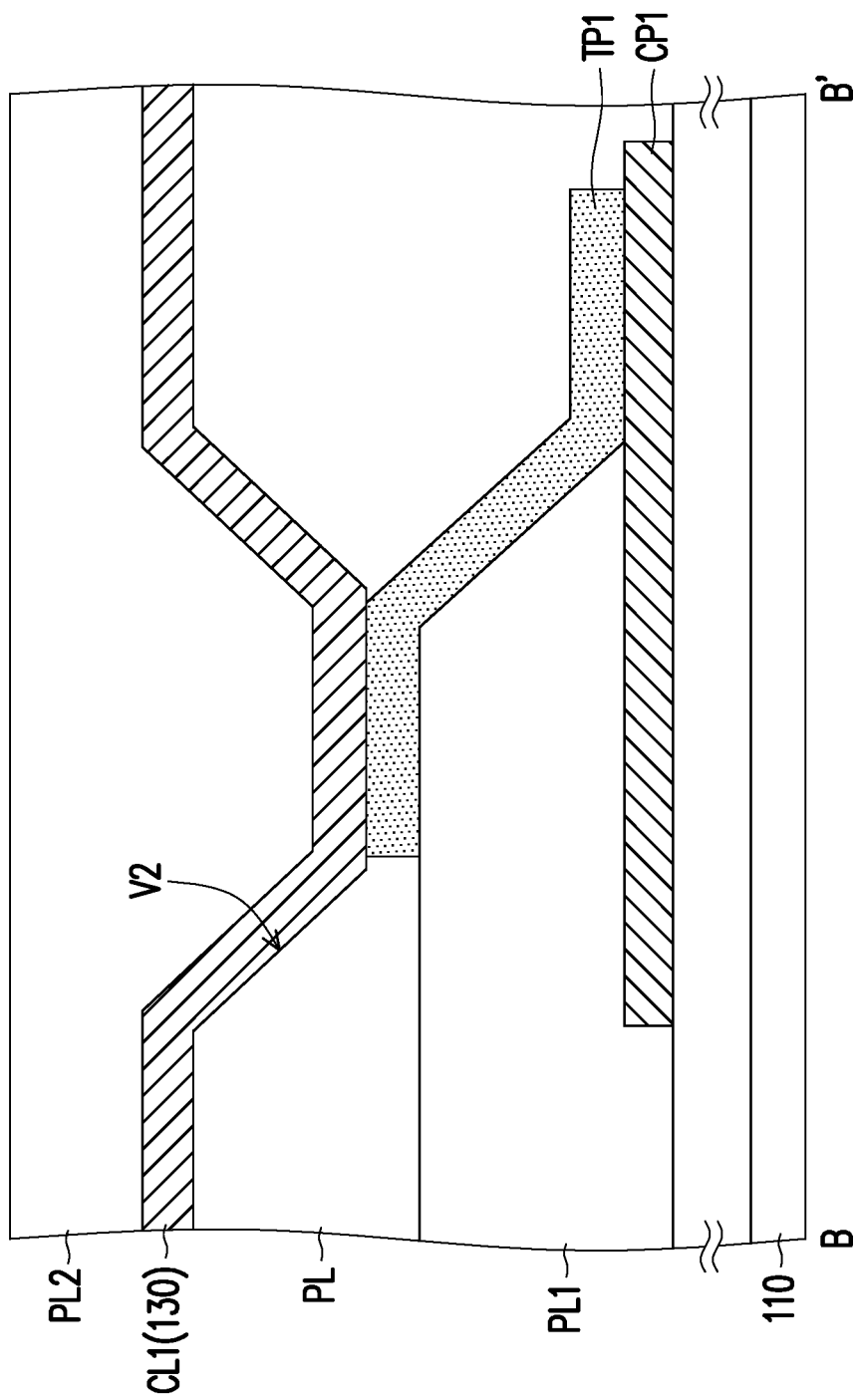
FIG. 2B is a schematic cross-sectional view along section line B-B' of FIG. 2A.

FIG. 2A is a schematic partial top view of an optical sensing device 20 according to an embodiment of the invention. FIG. 2B is a schematic cross-sectional view along section line B-B' of FIG. 2A. In order to simplify the expression of the figure, FIG. 2B omits the film layers between the substrate 110 and a connecting pattern CP1.

Referring to FIG. 2A to FIG. 2B at the same time, the optical sensing device 20 includes the substrate 110, the plurality of sensing elements 120, the planarization layer PL, and the light-shielding layer 130. Compared with the optical sensing device 10 shown in FIG. 1A to FIG. 1C, the optical sensing device 20 shown in FIG. 2A to FIG. 2B is different in that: the light-shielding layer 130 of the optical sensing device 20 includes the net-shaped light-shielding patterns NS and a wire pattern CL1, and the wire pattern CL1 may replace the signal line VL1 of the optical sensing device 10.

In the present embodiment, the wire pattern CL1 is separated from the net-shaped light-shielding patterns NS and belongs to the same film layer, and the wire pattern CL1 may be located between the net-shaped light-shielding patterns NS on adjacent sensing elements 120. The wire pattern CL1 may be electrically connected to the system voltage VSS, and the wire pattern CL1 may also be electrically connected to the connecting pattern CP1 via a via hole V2 in the planarization layer PL and a transfer pattern TP1, and the connecting pattern CP1 may form, for example, the first terminal T1a of the transistor T1. In some embodiments, the transfer pattern TP1 may belong to the same film layer as the second net-shaped electrode NE2, and the connecting pattern CP1 may belong to the same film layer as the first net-shaped electrode NE1. Since the parasitic capacitance between the wire pattern CL1 and the first net-shaped electrode NE1 is smaller than the parasitic capacitance between the signal line VL1 and the first net-shaped electrode NE1, stray capacitance between the sensing elements 120 and the surrounding wires may be reduced, thereby improving the sensing sensitivity of the optical sensing device 20.

Figure 3A:
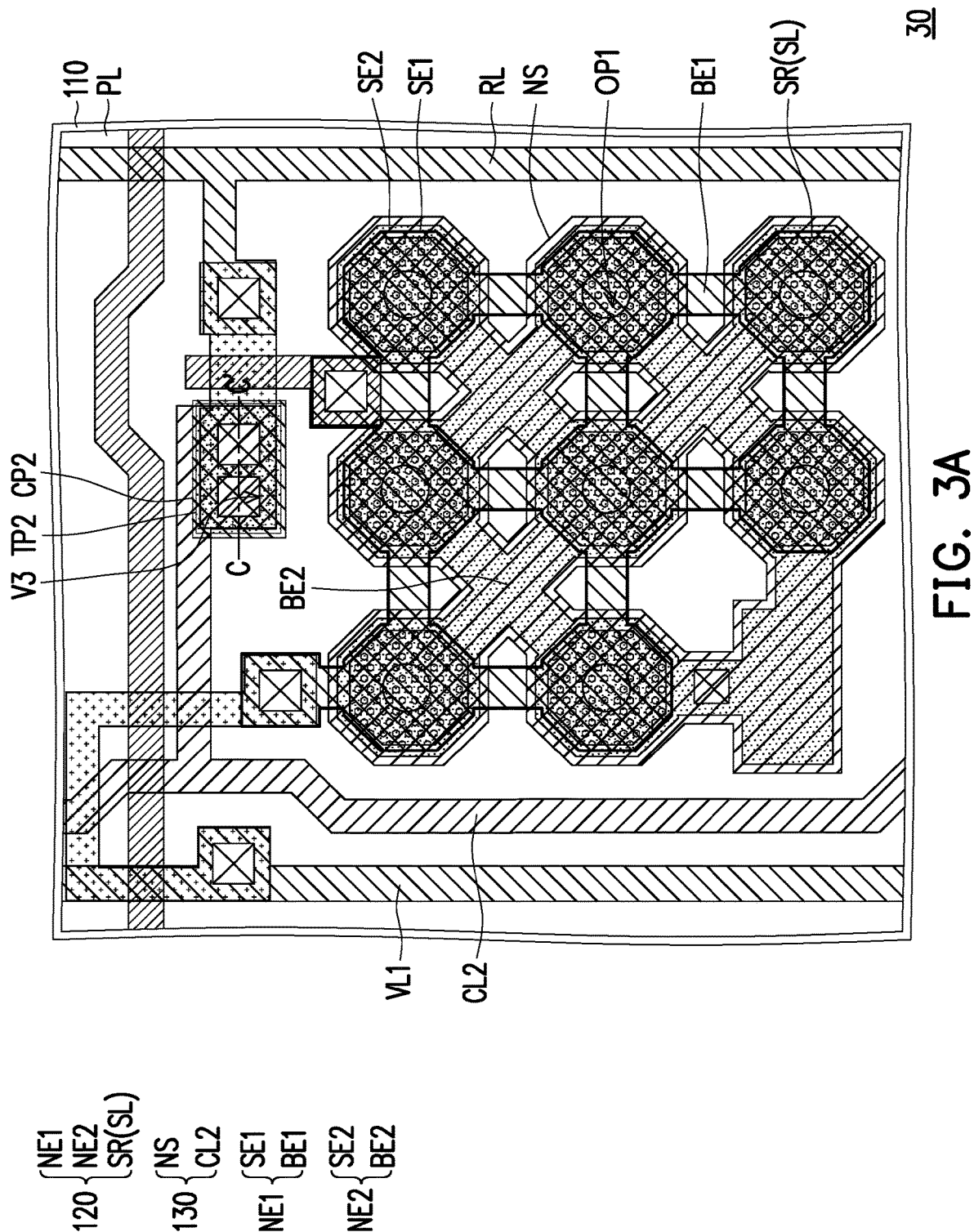
FIG. 3A is a schematic partial top view of an optical sensing device 30 according to an embodiment of the invention.
Figure 3B:
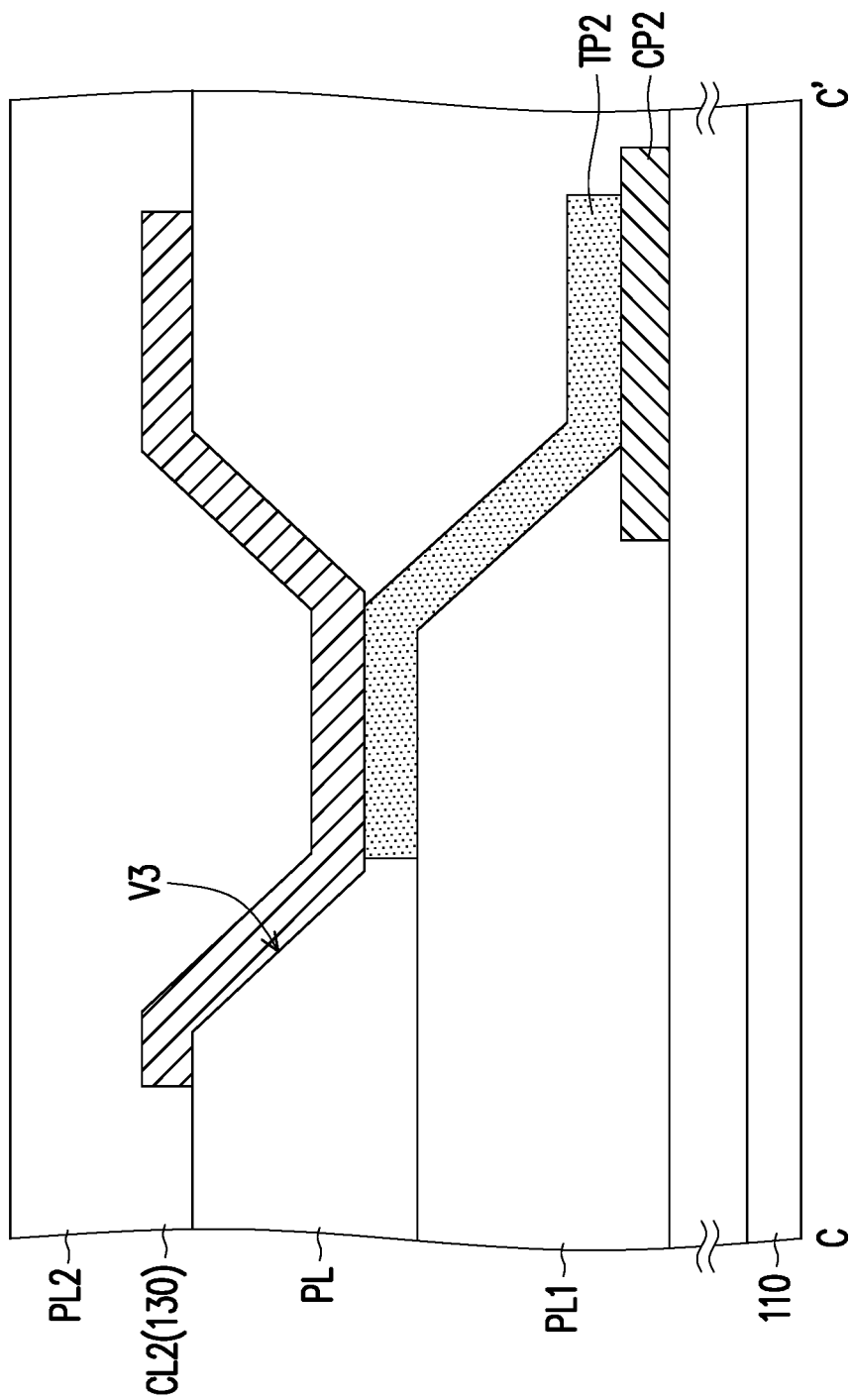
FIG. 3B is a schematic cross-sectional view along section line C-C' of FIG. 3A.

FIG. 3A is a schematic partial top view of an optical sensing device 30 according to an embodiment of the invention. FIG. 3B is a schematic cross-sectional view along section line C-C' of FIG. 3A. In order to simplify the expression of the figure, FIG. 3B omits the film layers between the substrate 110 and a connecting pattern CP2.

Referring to FIG. 3A to FIG. 3B at the same time, the optical sensing device 30 includes the substrate 110, the plurality of sensing elements 120, the planarization layer PL, and the light-shielding layer 130. Compared with the optical sensing device 10 shown in FIG. 1A to FIG. 1C, the optical sensing device 30 shown in FIG. 3A to FIG. 3B is different in that: the light-shielding layer 130 of the optical sensing device 30 includes the net-shaped light-shielding patterns NS and a wire pattern CL2, and the wire pattern CL2 may replace the signal line VL2 of the optical sensing device 10.

In the present embodiment, the wire pattern CL2 is separated from the net-shaped light-shielding patterns NS and belongs to the same film layer, and the wire pattern CL2 may be located between the net-shaped light-shielding patterns NS on adjacent sensing elements 120. The wire pattern CL2 may be electrically connected to the system voltage VDD, and the wire pattern CL2 may also be electrically connected to the connecting pattern CP2 via a via hole V3 in the planarization layer PL and a transfer pattern TP2, and the connecting pattern CP2 may form, for example, the first terminal T2a of the transistor T2. In some embodiments, the transfer pattern TP2 may belong to the same film layer as the second net-shaped electrode NE2, and the connecting pattern CP2 may belong to the same film layer as the first net-shaped electrode NE1. Since the parasitic capacitance between the wire pattern CL2 and the first net-shaped electrode NE1 is smaller than the parasitic capacitance between the signal line VL2 and the first net-shaped electrode NE1, stray capacitance between the sensing elements 120 and the surrounding wires may be reduced, thereby improving the sensing sensitivity of the optical sensing device 30.

Figure 4A:
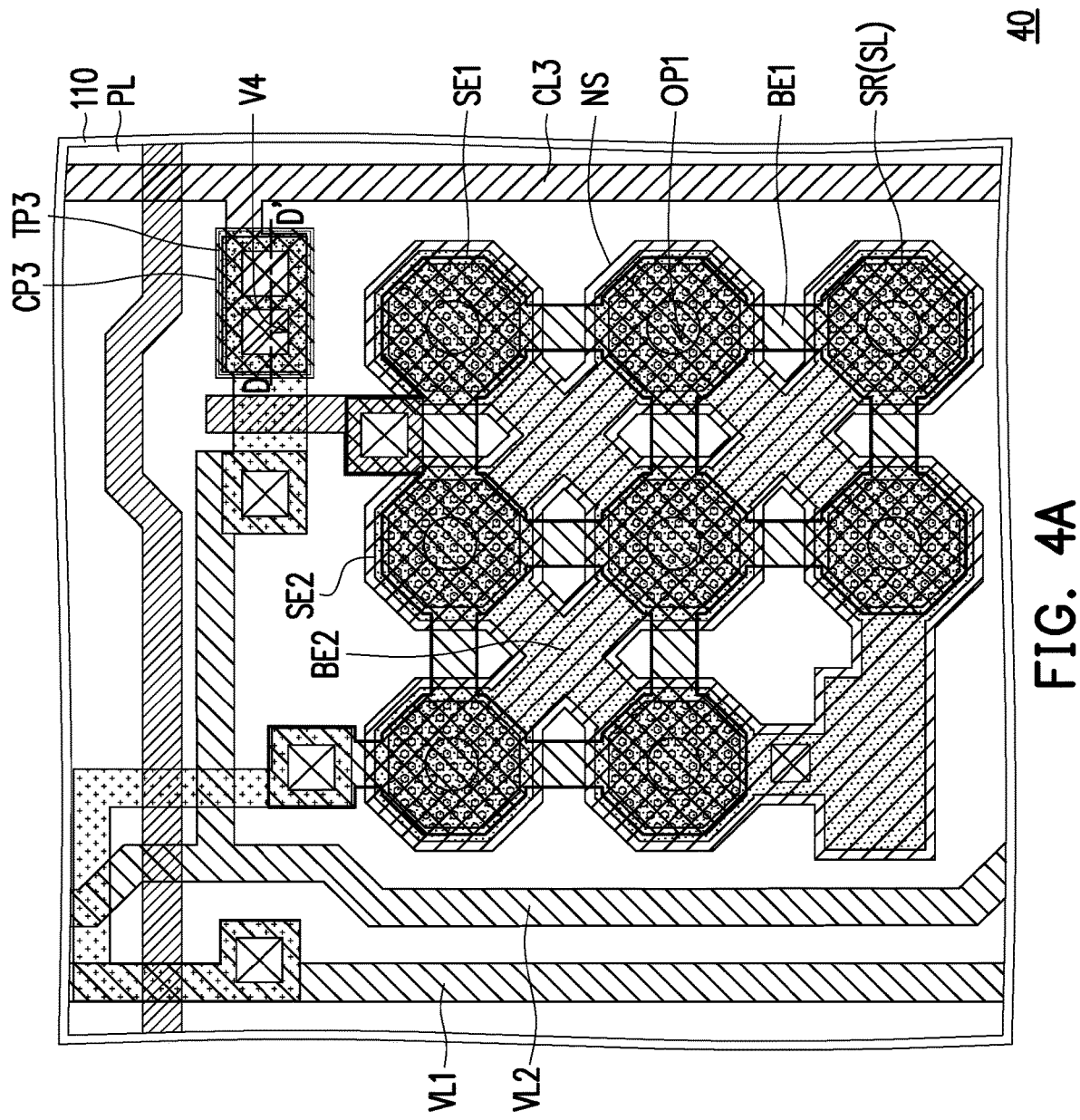
FIG. 4A is a schematic partial top view of an optical sensing device 40 according to an embodiment of the invention.
Figure 4B:
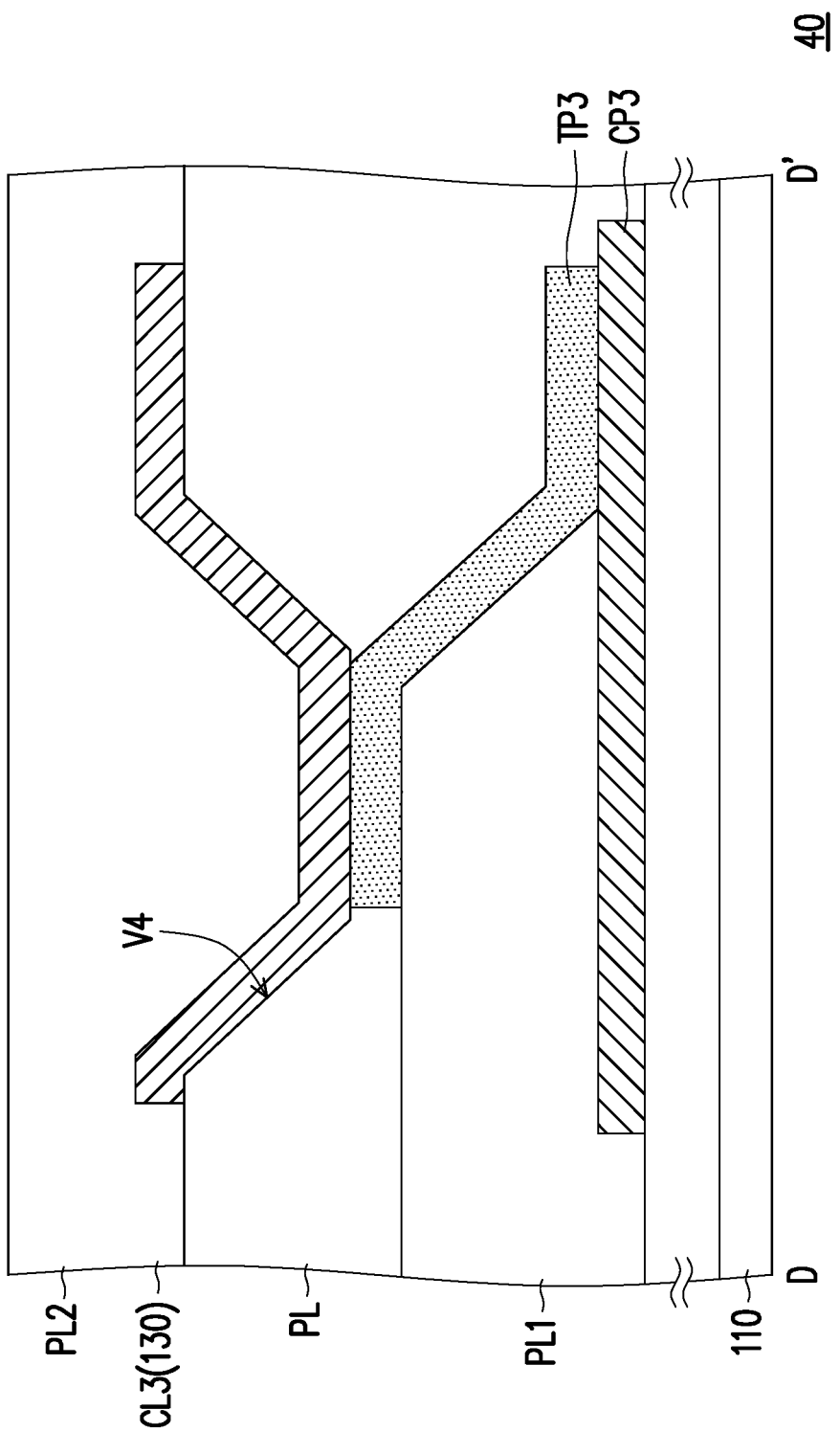
FIG. 4B is a schematic cross-sectional view along section line D-D' of FIG. 4A.

FIG. 4A is a schematic partial top view of an optical sensing device 40 according to an embodiment of the invention. FIG. 4B is a schematic cross-sectional view along section line D-D' of FIG. 4A. In order to simplify the expression of the figures, FIG. 4B omits the film layer between the substrate 110 and a connecting pattern CP3.

Referring to FIG. 4A to FIG. 4B at the same time, the optical sensing device 40 includes the substrate 110, the plurality of sensing elements 120, the planarization layer PL, and the light-shielding layer 130. Compared with the optical sensing device 10 shown in FIG. 1A to FIG. 1C, the optical sensing device 40 shown in FIG. 4A to FIG. 4B is different in that: the light-shielding layer 130 of the optical sensing device 40 includes the net-shaped light-shielding patterns NS and a wire pattern CL3, and the wire pattern CL3 may replace the signal line RL of the optical sensing device 10.

In the present embodiment, the wire pattern CL3 is separated from the net-shaped light-shielding patterns NS and belongs to the same film layer as the net-shaped light-shielding patterns NS, and the wire pattern CL3 may be located between the net-shaped light-shielding patterns NS on adjacent sensing elements 120. The wire pattern CL3 may be electrically connected to the connecting pattern CP3 via a via hole V4 in the planarization layer PL and a transfer pattern TP3, and the connecting pattern CP3 may form the second terminal T2b of the transistor T2, so that the wire pattern CL3 may be used to output the sensing signal Sout of the sensing elements 120. In some embodiments, the transfer pattern TP3 may belong to the same film layer as the second net-shaped electrode NE2, and the connecting pattern CP3 may belong to the same film layer as the first net-shaped electrode NE1. Since the parasitic capacitance between the wire pattern CL3 and the first net-shaped electrode NE1 is smaller than the parasitic capacitance between the signal line RL and the first net-shaped electrode NE1, stray capacitance between the sensing elements 120 and the surrounding wires may be reduced, thereby improving the sensing sensitivity of the optical sensing device 40.

Based on the above, the optical sensing device of the invention may eliminate the parasitic capacitance between the net-shaped light-shielding patterns and the second net-shaped electrodes by electrically connecting the net-shaped light-shielding patterns to the second net-shaped electrodes of the sensing elements. Moreover, the second bridge portions of the second net-shaped electrodes of the sensing elements in the optical sensing device of the invention is not overlapped with the first bridge portions of the first net-shaped electrodes. Thereby, parasitic capacitance between the first net-shaped electrodes and the second net-shaped electrodes is reduced. Moreover, in the optical sensing device of the invention, wire patterns and the like electrically connected to the system voltage or outputting the sensing signal may also be disposed at the light-shielding layer, thereby reducing stray capacitance between the sensing elements and the surrounding wires. By reducing the parasitic capacitance and stray capacitance between the sensing elements and the light-shielding layer and/or surrounding wires, the sensing sensitivity of the optical sensing device may be improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An optical sensing device, comprising:
   a substrate;
   a plurality of sensing elements located on the substrate, and each of the sensing elements comprises a first net-shaped electrode, a second net-shaped electrode, and a sensing layer, wherein the first net-shaped electrode is located between the sensing layer and the substrate, and the sensing layer is located between the first net-shaped electrode and the second net-shaped electrode;
   a planarization layer located on the sensing elements and the substrate and having a plurality of via holes; and
   a light-shielding layer located on the planarization layer and comprising a plurality of net-shaped light-shielding patterns,
   wherein the plurality of net-shaped light-shielding patterns are respectively overlapped with the second net-shaped electrodes of the plurality of sensing elements, and the plurality of net-shaped light-shielding patterns are respectively electrically connected to the second net-shaped electrodes of the plurality of sensing elements via the plurality of via holes.

2. The optical sensing device of claim 1, wherein the net-shaped light-shielding patterns are partially overlapped with the first net-shaped electrode.

3. The optical sensing device of claim 1, wherein the sensing layer comprises a plurality of separated sensing patterns, each of the net-shaped light-shielding patterns has a plurality of openings, and the plurality of openings are respectively overlapped with the plurality of sensing patterns.

4. The optical sensing device of claim 3, wherein a spacing between the plurality of sensing patterns is the same.

5. The optical sensing device of claim 3, wherein a shape of the sensing patterns is a polygon or a circle.

6. The optical sensing device of claim 1, wherein the first net-shaped electrode comprises a first sensing electrode portion and a first bridge portion connected to each other, the first sensing electrode portion is overlapped with the sensing layer, and the first bridge portion is not overlapped with the sensing layer.

7. The optical sensing device of claim 6, wherein the second net-shaped electrode comprises a second sensing electrode portion and a second bridge portion connected to each other, the second sensing electrode portion is overlapped with the sensing layer, and the second bridge portion is not overlapped with the sensing layer.

8. The optical sensing device of claim 7, wherein the second bridge portion is not overlapped with the first bridge portion.

9. The optical sensing device of claim 1, wherein the light-shielding layer further comprises a plurality of wire patterns respectively located between the plurality of net-shaped light-shielding patterns and separated from the plurality of net- shaped light-shielding patterns.

10. The optical sensing device of claim 9, wherein the plurality of wire patterns are respectively electrically connected to a system voltage or output a sensing signal generated by the sensing elements.

11. An optical sensing device, comprising:
    a substrate;

a plurality of sensing elements located on the substrate to generate a sensing signal;

a planarization layer located on the sensing elements and the substrate; and a light-shielding layer located on the planarization layer and comprising a plurality of separated light-shielding patterns and a plurality of wire patterns, wherein the plurality of light-shielding patterns are respectively overlapped with the plurality of sensing elements, and the plurality of wire patterns are respectively electrically connected to a system voltage or output the sensing signal, wherein the sensing elements comprise a first net-shaped electrode, a second net-shaped electrode, and a plurality of sensing patterns, and the plurality of sensing patterns are located between the first net-shaped electrode and the second net-shaped electrode, wherein the light-shielding patterns are electrically connected to the second net-shaped electrode via via holes of the planarization layer.

12. The optical sensing device of claim 11, wherein the light-shielding patterns have a net-shaped contour.

13. The optical sensing device of claim 11, wherein the light-shielding patterns are partially overlapped with the first net-shaped electrode.

14. The optical sensing device of claim 11, wherein the second net-shaped electrode is partially overlapped with the first net-shaped electrode.

15. The optical sensing device of claim 11, wherein the light-shielding patterns have a plurality of openings, and the plurality of openings are respectively overlapped with the plurality of sensing patterns.

16. The optical sensing device of claim 11, wherein a shape of the sensing patterns is a polygon or a circle.

* * * * *